United States Patent
Preston

(10) Patent No.: US 7,716,972 B2
(45) Date of Patent: May 18, 2010

(54) METHOD FOR MONITORING THE PERFORMANCE OF A COMPRESSION-IGNITION, INTERNAL COMBUSTION ENGINE

(75) Inventor: William Hugh Preston, Upper Basildon (GB)

(73) Assignee: Castrol Limited, Swindon, Wiltshire (GB)

( * ) Notice: Subject to any disclaimer, the term of this patent is extended or adjusted under 35 U.S.C. 154(b) by 222 days.

(21) Appl. No.: 11/991,060

(22) PCT Filed: Aug. 22, 2006

(86) PCT No.: PCT/GB2006/003139

§ 371 (c)(1),
(2), (4) Date: Mar. 31, 2008

(87) PCT Pub. No.: WO2007/028947

PCT Pub. Date: Mar. 15, 2007

(65) Prior Publication Data

US 2009/0120177 A1  May 14, 2009

(30) Foreign Application Priority Data

Sep. 6, 2005  (EP)  .................................. 05255487

(51) Int. Cl.
*G01M 15/04* (2006.01)
(52) U.S. Cl. .................................................. 73/114.55
(58) Field of Classification Search .............. 73/114.52, 73/114.55, 114.56
See application file for complete search history.

(56) References Cited

U.S. PATENT DOCUMENTS

| 5,049,742 | A  | 9/1991 | Hosonuma et al. |
| 2004/0128905 | A1 | 7/2004 | Clark et al. |
| 2004/0147413 | A1 | 7/2004 | Spall et al. |

FOREIGN PATENT DOCUMENTS

| CA | 2 365 814 | 6/2003 |
| DE | 100 53 069 | 5/2002 |
| EP | 0 635 558 | 1/1995 |

(Continued)

OTHER PUBLICATIONS

Sadeghi-Jorabachi et al., "Estimation of bio-diesel in lubricating oil using Fourier transform infrared spectroscopy combined with a mid-infrared fibre optic probe", *Spectroscopy Europe*, vol. 6(2), 1994, pp. 16, 18 and 20-21.

(Continued)

*Primary Examiner*—Eric S McCall
(74) *Attorney, Agent, or Firm*—Nixon & Vanderhye

(57) ABSTRACT

A method for monitoring the performance of a compression-ignition, internal combustion engine which method comprises lubricating the engine with a crankcase lubricant, and introducing a fuel to the engine to operate the engine characterized in that the fuel comprises greater than 50% by weight of petroleum-based, middle distillate fuel oil and/or a Fischer Tropsch derived middle distillate fuel oil and 2.5% to 25% by weight of at least one lower alkyl ester of a fatty acid, and the performance of the engine is monitored by measuring the rate of ingress of lower alkyl ester of a fatty acid from the fuel into the crankcase lubricant by infra red spectroscopic analysis of the crankcase lubricant.

16 Claims, 3 Drawing Sheets

Graph of infrared peak intensity at 1746cm$^{-1}$ against rapeseed methyl ester concentration.

FOREIGN PATENT DOCUMENTS

| | | |
|---|---|---|
| JP | 59-219598 | 12/1984 |
| JP | 2005-089577 A | 4/2005 |
| WO | 01/72930 | 10/2001 |
| WO | 03/022960 | 3/2003 |
| WO | 2005/054657 | 1/2005 |

OTHER PUBLICATIONS

Lozano et al., "Lubricant Analysis: Investigation of Crankcase Lubricant", *Journal of Planar Chromatography*, vol. 12, 1999, pp. 228-229, XP009059918.

Maleque et al., "Bio-Fuel-Contamination Lubricant and Hardening Effects on the Friction and Wear of AISI 1045 Steel", *Tribology Transactions*, vol. 40, 1998, pp. 155-159.

Siekmann et al., "The influence of lubricant contamination by methyl esters of plant oils on oxidation stability and life", *ASAE Publication*, 1982 (4-82 Veg. Oil Fuels) 209-17.

International Search Report for PCT/GB2006/003139 mailed Oct. 6, 2006.

Written Opinion for PCT/GB2006/003139 mailed Oct. 6, 2006.

International Preliminary Report on Patentability for PCT/GB2006/003139 mailed Aug. 9, 2007.

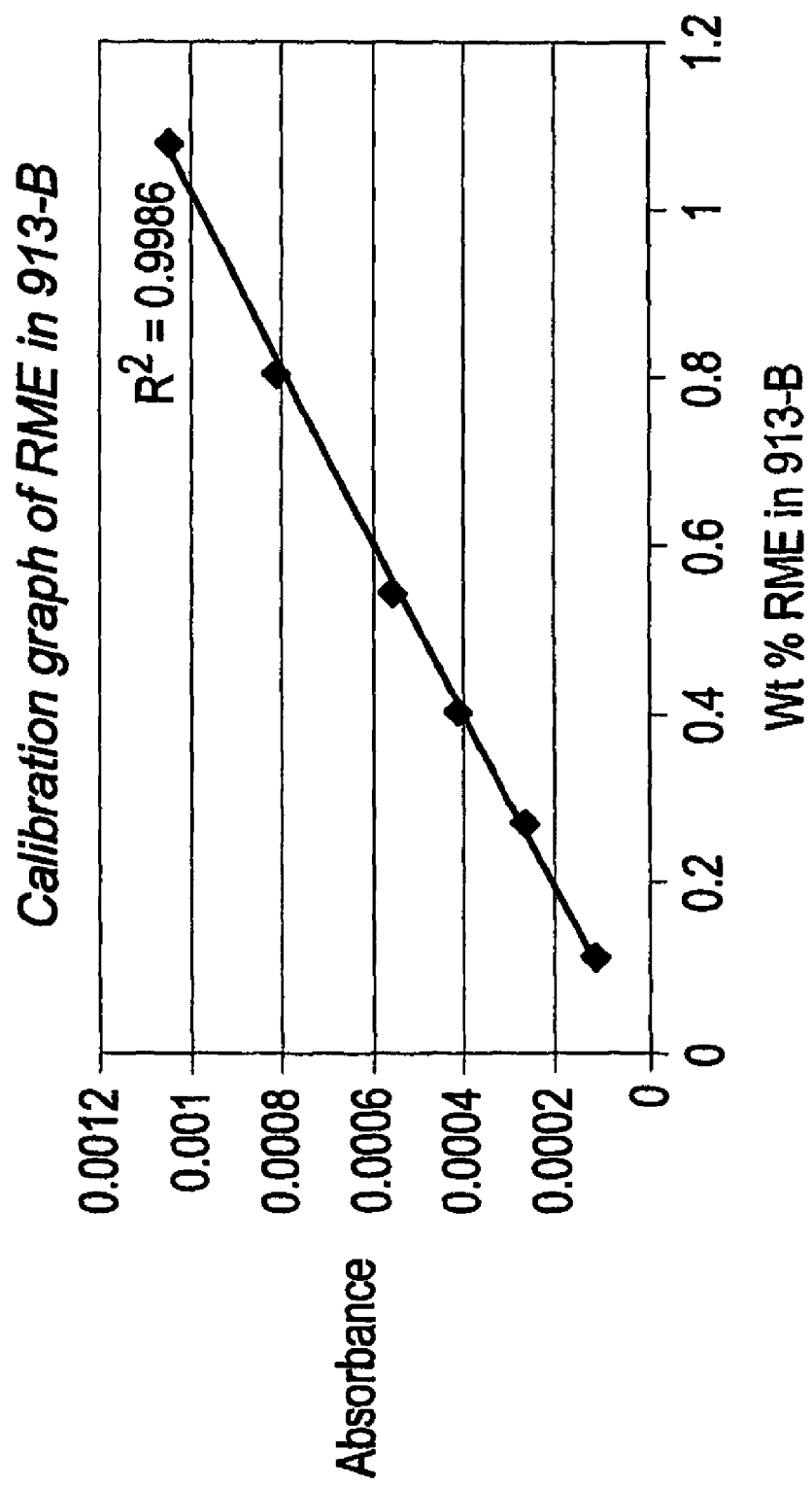
Fig. 1 - Graph of infrared peak intensity at 1746cm$^{-1}$ against rapeseed methyl ester concentration.

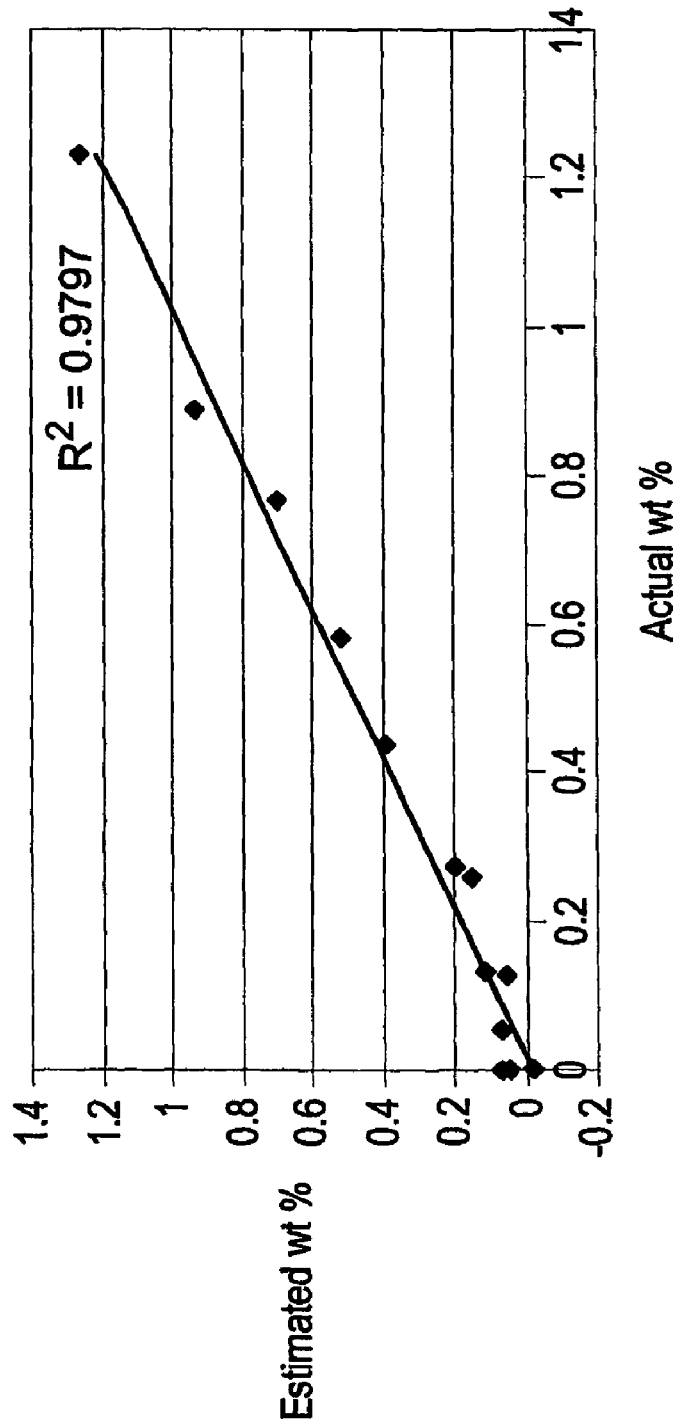
Fig.2 - Graph of rapeseed methyl ester concentration in used oils - estimated by infrared spectroscopic analysis versus actual.

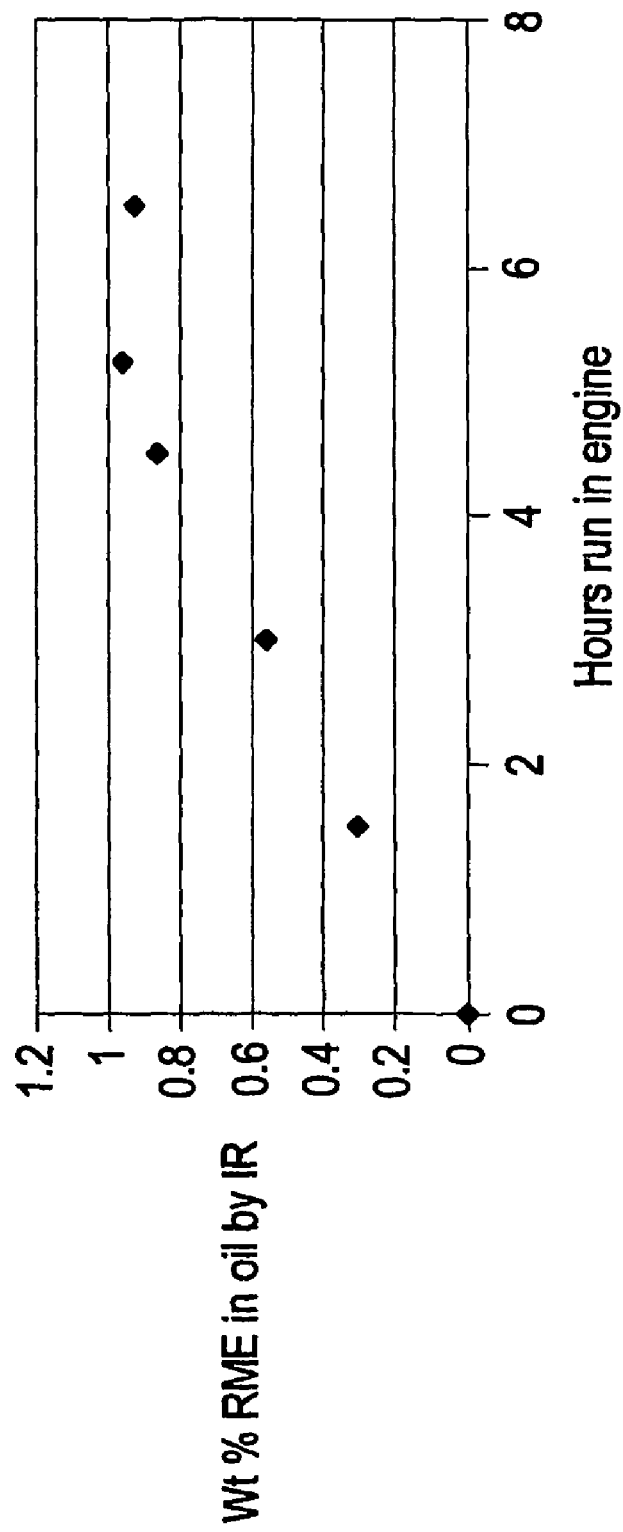
Fig. 3 – Graph of rapeseed methyl ester concentration in oil versus engine running time.

METHOD FOR MONITORING THE PERFORMANCE OF A COMPRESSION-IGNITION, INTERNAL COMBUSTION ENGINE

This application is the U.S. national phase of International Application No. PCT/GB2006/003139 filed 22 Aug. 2006 which designated the U.S. and claims priority to European Patent Application No. 05255487.0 filed 6 Sep. 2005, the entire contents of each of which are hereby incorporated by reference.

The present invention relates in general to compression-ignition, internal combustion engines and in particular, to a method for monitoring the performance of a compression-ignition, internal combustion engine.

In operation of compression-ignition, internal combustion engines (diesel engines), there may be ingress of fuel into the crankcase lubricant. The dilution of crankcase lubricant by some fuel is part of the normal operation of the engine. Abnormal ingress of fuel into the crankcase lubricant can be caused for example by faulty injectors or excessive cold stop/start operation. Defective sensors, such as air mass flow sensors, might also cause excessive dilution of crankcase lubricant by fuel.

Measuring ingress of fuel into the crankcase lubricant can be used to monitor the performance of the engine. This is done by analysis of the crankcase lubricant after periods of operation.

Engine performance monitoring by measuring ingress of fuel into the crankcase lubricant is used in the design of engines by monitoring the performance of different engine configurations. This use can involve calibrating the engine to determine suitable algorithms for crankcase lube drain intervals and/or particulate filter regeneration intervals (when such filters are used) and/or algorithms for safe and/or optimum operating conditions for the engine. Such algorithms can relate parameters such as accelerator pedal displacement and/or gear position with engine parameters such as fuel injection, torque control and power control.

Fuels which might be used for diesel engines include not only petroleum based diesel fuels and/or Fischer Tropsch derived fuels (middle distillate fuel oils) but also rapeseed oil methyl esters (bio-diesel).

One method which has been used to measure the ingress of bio-diesel fuel into the crankcase lubricant is Fourier-transform IP spectroscopy. Thus, Sadeghi-Jorabchi, H. et al in Spectroscopy Europe (1994), 6(2), 16, 18, 20-1 describe how rapeseed oil methyl esters (i.e., "bio-diesel"), can be estimated as a contaminant in lubricating oil by Fourier-transform IR spectroscopy combined with a mid-IR fibre optical probe, by monitoring the carbonyl absorption at 1820-1680 $cm^{-1}$. Sadeghi-Jorabchi et al does not contemplate the use of bio-diesel/petroleum based diesel fuels—biodiesel is referred to as an environmentally friendly alternative to conventional diesel fuel.

Another method which has been used to measure the ingress of bio-diesel fuel into the crankcase lubricant is Thin Layer Chromatography (TLC). Thus, Lozano, P. et al in Journal of Planar Chromatography, 12(3), 228-229 describe the use of thin-layer chromatography for quantitative determination of the dilution of diesel crankcase oil by vegetable oil-based diesel fuels (for example by rapeseed oil methyl esters, rapeseed oil, and oleic acid as model components). TLC is said to offer an alternative to infra red investigation of lubricants. However, the method of TLC described by Lonzano etc al is time-consuming. This makes it an unattractive method for monitoring engine performance. The method is unattractive for monitoring engine performance for the design of engines and/or when calibrating the engine to determine suitable algorithms for crankcase lube drain intervals and/or particulate filter regeneration intervals and/or algorithms for safe and/or optimum operating conditions for the engine.

There remains a need for a method of monitoring the performance of a compression-ignition, internal combustion engine which overcomes, or at least mitigates these disadvantages.

Thus, according to the present invention there is provided a method for monitoring the performance of a compression-ignition, internal combustion engine which method comprises:
lubricating the engine with a crankcase lubricant, and
introducing a fuel to the engine to operate the engine,
characterised in that
the fuel comprises greater than 50% by weight of petroleum-based, middle distillate fuel oil and 2.5% to 25% by weight of at least one lower alkyl ester of a fatty acid,
and the performance of the engine is monitored by measuring the rate of ingress of lower alkyl ester of a fatty acid from the fuel into the crankcase lubricant by infra red spectroscopic analysis of the crankcase lubricant.

The petroleum-based, middle distillate fuel oil used in the present invention may be replaced in part or in whole by a Fisher Tropsch derived, middle distillate fuel oil.

Thus, according to the present invention there is also provided a method for monitoring the performance of a compression-ignition, internal combustion engine which method comprises:
lubricating the engine with a crankcase lubricant, and
introducing a fuel to the engine to operate the engine,
characterised in that
the fuel comprises greater than 50% by weight of petroleum-based, middle distillate fuel oil and/or Fischer Tropsch derived, middle distillate fuel oil and 2.5% to 25% by weight of at least one lower alkyl ester of a fatty acid,
and the performance of the engine is monitored by measuring the rate of ingress of lower alkyl ester of a fatty acid from the fuel into the crankcase lubricant by infra red spectroscopic analysis of the crankcase lubricant.

The present invention solves the technical problem defined above by the use of lower alkyl ester of a fatty acid in the fuel as a marker, rather than as a substantial part of the fuel and monitoring the rate of ingress of at least one lower alkyl ester of a fatty acid into the crankcase lubricant by infra red spectroscopic analysis of the crankcase lubricant.

It has been unexpectedly found that it is possible to detect by infra red spectroscopy, lower alkyl esters of a fatty acid at low concentrations in the crankcase lubricant as a result of it being present in the fuel only as a marker at a concentration of 2.5% to 25% by weight and hence to determine the dilution of the oil by the fuel.

The fuel comprises at least one lower alkyl ester of a fatty acid at a concentration of 2.5% to 25% by weight. Preferably, the fuel comprises at least one lower alkyl ester of a fatty acid at a concentration of 5 to 15% by weight. Most preferably, the fuel comprises at least one lower alkyl ester of a fatty acid at a concentration of about 10% by weight.

Preferably, the lower alkyl ester of a fatty acid is a methyl, ethyl, propyl and/or butyl ester. Preferably, the lower alkyl ester of a fatty acid is an ester of a fatty acid in which the fatty acid has 10 to 25 carbon atoms. More preferably, the lower alkyl ester of a fatty acid is a methyl ester of a fatty acid in which the fatty acid has 12 to 22 carbon atoms. Suitably, the fatty acid is selected from the group consisting of lauric acid, myristic acid, palmitic acid, palmitoleic acid, stearic acid, oleic acid, elaidic acid, petroselic acid, ricinoleic acid, elaestearic acid, linoleic acid, linolenic acid, eicosanoic acid, gadoleic acid, docosanoic acid, erucic acid and mixtures thereof.

Mixtures of lower alkyl esters of fatty acids may be used. Preferably, the fuel comprises at least one methyl ester of fatty acids in which the fatty acids have 16 to 22 carbon numbers and 1, 2, or 3 double bonds. Preferably, the fuel, comprises at least one methyl ester of oleic acid, linoleic acid, linolenic acid and/or erucic acid.

Lower alkyl esters of fatty acids esters may be made by transesterification of triglycerides of fatty acids. The triglycerides may be obtained from vegetable oils. Suitable triglycerides may be obtained from coriander oil, castor oil, soyabean oil, cottonseed oil, peanut oil, sunflower oil, rapeseed oil, salmon oil, Jatropha oil, tallow (for example sheep and/or beef tallow), palm oil or used cooking oil esters.

A preferred lower alkyl ester of a fatty acid is rapeseed oil methyl ester (RME). A suitable rapeseed oil methyl ester is based on a rapeseed oil, the fatty acid component of which is derived from more than 80 wt % from unsaturated fatty acids with 18 carbon atoms.

The lower alkyl ester of a fatty acid may be prepared by esterification of a fatty acid. Suitably, the esterification may be performed using methanol. Suitably, the esterification may be performed in the presence of a catalyst. A suitable catalyst is sodium hydroxide.

The lower alkyl ester of a fatty acid may be selected so as to have a boiling range, cetane number and/or viscosity compatible with that of the petroleum-based middle distillate fuel oil and/or Fischer Tropsch derived, middle distillate fuel oil.

In the present invention, the compression-ignition, internal combustion engine operates with a fuel which comprises at least 50% by weight of petroleum-based, middle distillate fuel oil and/or Fischer Tropsch derived middle distillate fuel oil. This has an advantage that any effect which the presence of the lower alkyl ester of a fatty acid in the fuel might have on the engine's performance is mitigated. Another advantage of the present invention is that it is not necessary to operate the engine using a fuel which is predominantly lower alkyl ester of a fatty acid in order to monitor the performance by measuring the rate of ingress of lower alkyl ester of a fatty acid from the fuel into the crankcase lubricant by infra red spectroscopic analysis of the crankcase lubricant.

In the present invention, the compression-ignition, internal combustion engine operates with a fuel which comprises preferably at least 75% by weight of petroleum-based, middle distillate fuel oil and/or Fischer Tropsch derived fuel oil.

The petroleum-based, middle distillate fuel oil and/or Fisher Tropsch derived, middle distillate fuel oil preferably has a boiling point in the range 170 to 370° C. The petroleum-based, middle distillate fuel oil and/or Fisher Tropsch derived, middle distillate fuel oil preferably has a density in the range 0.780 to 0.860 g/cc. The petroleum-based, middle distillate fuel oil and/or Fisher Tropsch derived, middle distillate fuel oil preferably has a cetane number in the range 40 to 75. More preferably, the petroleum-based, middle distillate fuel oil and/or Fisher Tropsch derived, middle distillate fuel oil has a boiling point in the range 170 to 370° C., a density in the range 0.810 to 0.860 g/cc and a cetane number in the range 45 to 65.

Preferably, the petroleum-based, middle distillate fuel oil and/or Fisher Tropsch derived, middle distillate fuel oil is prepared using known refinery processes.

The fuel may be prepared by producing a petroleum-based middle distillate fuel and/or Fischer Tropsch derived, middle distillate fuel oil by refinery processes and then blending it with at least one lower alkyl ester of a fatty acid and optionally with less than 1000 ppm by weight in total of one or more middle distillate fuel additives.

The fuel preferably has a boiling point in the range 170 to 370° C. The fuel preferably has a density in the range 0.810 to 0.860 g/cc. The fuel preferably has a cetane number in the range 45 to 65. More preferably, the fuel has a boiling point in the range 170 to 370° C., a density in the range 0.810 to 0.860 g/cc and a cetane number in the range 45 to 55.

The fuel preferably has a sulphur content of at most (that is, less than or equal to) 2000 ppm by weight, more preferably at most 50 ppm by weight, yet more preferably at most 10 ppm by weight.

The fuel may also comprise one or more fuel additives. The fuel additives, if present, are preferably present at a low concentration to avoid or mitigate interference with the spectroscopic analysis. If present, preferably, the fuel additives are present at a total concentration of less than 1000 ppm by weight. Suitable additives may be selected from the group consisting of stabilisers, dispersants, antioxidants, corrosion inhibitors, demulsifiers, antifoams, cetane improvers, lubricity additives, anti static additives, wax anti-settling agents, and cold flow improvers.

Preferably, the fuel consists of greater than 75% by weight petroleum-based, middle distillate fuel oil, 2.5 to 25% by weight of at least one lower alkyl ester of a fatty acid, and optionally, less than 1000 ppm by weight in total of one or more middle distillate fuel additives selected from the group consisting of stabilisers, dispersants, antioxidants, corrosion inhibitors, demulsifiers, antifoams, cetane improvers, lubricity additives, anti static additives, wax anti-settling agents, and cold flow improvers and has a sulphur content of at most 0.2% by weight, preferably at most 0.05% by weight and more preferably at most 0.01% by weight.

Preferably, the fuel consists of greater than 75% by weight petroleum-based, middle distillate fuel oil and/or Fischer Tropsch derived middle distillate fuel oil, 2.5 to 25% by weight of at least one lower alkyl ester of a fatty acid, and optionally, less than 1000 ppm by weight in total of one or more middle distillate fuel additives selected from the group consisting of stabilisers, dispersants, antioxidants, corrosion inhibitors, demulsifiers, antifoams, cetane improvers, lubricity additives, anti static additives, wax anti-settling agents, and cold flow improvers and has a sulphur content of at most 0.2% by weight, preferably at most 0.05% by weight and more preferably at most 0.01% by weight.

The compression-ignition, internal combustion engine may be a stationary engine or an engine in a vehicle. Preferably, the engine operates over a range of speeds and loads, for example a vehicle engine. More preferably, the engine is a light duty vehicle engine (for example, a passenger car engine) or is a heavy duty vehicle engine (for example, a truck engine).

Preferably, the engine has a diesel particulate filter on its exhaust.

Most preferably, the engine is a direct injection, turbo diesel engine having a common rail injection system and at least one diesel particulate filter on its exhaust.

The spectroscopic analysis may be mid infra red spectroscopic analysis. The spectroscopic analysis may be Transmission mid infra red spectroscopic analysis. Preferably, the spectroscopic analysis is Attenuated Total Reflectance (ATR) mid infra red spectroscopic analysis. The analysis may determine spectroscopic absorbance of a sample of the crankcase lubricant at a wave number characteristic of at least one lower alkyl ester of a fatty acid. Preferably, the wave number is in the range 1700 to 1800 $cm^{-1}$. More, preferably, the wave number is characteristic of a carbonyl ester, for example at about 1746 $cm^{-1}$. The absorbance characteristic of the at least one lower alkyl ester of a fatty acid may be measured as an absorbance peak height or an absorbance peak area. It is preferred to use a fixed path length cell for the crankcase lubricant in the spectroscopic analysis. The cell is preferably a potassium bromide cell.

The spectroscopic analysis of the crankcase lubricant may be performed by taking samples of the crankcase lubricant at intervals and subjecting the samples to spectroscopic analysis to determine the rate of ingress of at least one lower alkyl ester of a fatty acid into the crankcase lubricant. The samples may be taken at regular intervals. Suitable regular intervals are regular intervals of 4 or 8 hours. The rate of ingress of lower alkyl ester of a fatty acid into the crankcase lubricant may be determined by the change in spectroscopic absorbance between samples of crankcase lubricant analysed at intervals.

The concentration of lower alkyl ester of a fatty acid in the crankcase lubricant may be determined by calibrating the spectroscopic analysis using at least one ester which is the same as is present in the fuel.

Having determined the rate of ingress of the fatty acid ester from the fuel into the crankcase lubricant, the performance of the engine is monitored according to the present invention. From a knowledge of the amount of lower alkyl ester of a fatty acid in the fuel, and an initial calibration to determine the amount of lower alkyl ester of a fatty acid in the fuel in the crankcase oil of the operating engine, it is possible to monitor rapidly, rate of ingress of fuel into the crankcase lubricant. Thus, the performance of the engine can be determined in terms of whether or not the rate of ingress of fuel into the crankcase lubricant is acceptable. To be acceptable, the rate of ingress of fuel into the crankcase lubricant should not be so high that the concentration of fuel in the lubricant exceeds a concentration limit before the crankcase lubricant is due to be changed routinely changed. The interval between routine crankcase lubricant changes is the drain interval and may be express as time and/or miles driven (for vehicles). Generally, for passenger vehicle engines, for example direct injection Euro I to III type, the acceptable or normal concentration is about 1% by weight of fuel in the crankcase lubricant. For diesel engines fitted with particulate filter systems the acceptable concentration limit may be greater than 5% and up to 10% by weight of fuel in the crankcase lubricant. Generally, the concentration limit specified by the manufacturer will not be greater than 10% by weight of fuel in the crankcase lubricant. The rate of ingress of the fuel can be determined from the rate of ingress of the ester and the concentration of ester in the fuel.

A suitable, procedure for monitoring the performance of an engine may involve the steps:

1. drain, flush and fill the engine to be tested with crankcase lubricant;
2. introduce a fuel to the engine and operate the engine at a desired speed and load whilst crankcase lubricant lubricants the engine until the crankcase lubricant reaches the required operating temperature (the fuel comprising greater than 50% by weight of petroleum-based, middle distillate fuel oil and/or Fischer Tropsch derived middle distillate fuel oil and 2.5% to 25% by weight of at least one lower alkyl ester of a fatty acid);
3. monitor the performance of the engine by measuring the rate of ingress of lower alkyl ester of a fatty acid from the fuel into the crankcase lubricant by infra red spectroscopic analysis of the crankcase lubricant (sampling of the crankcase lubricant at regular intervals may be required to obtain a measure of the rate of ingress of fuel into the crankcase lubricant);
4. stop engine, and repeat steps 1 to 3 with a different engine speed and/or load.

A similar procedure may be used to monitor the performance of the engine when the engine is a diesel engine fitted with a diesel particle filter (DPF) associated with the engine. In this procedure, in addition to or alternative to, changes in the speed and/or load of the engine, the engine fuel injection timing and/or rate of fuel injection may be adjusted between repeats of steps 1 to 4 to calibrate the engine. Thus, when the engine is operated with periodic (for example every 500 km) regeneration of the diesel particulate filter by injection of fuel into the engine late in its combustion stroke to produce a regeneration "burn" on the filter, the present invention can be used to provide a fast method for monitoring of the engine performance with differing engine fuel injection timing and/or rate of fuel injection.

Monitoring the performance of the engine can be used in the design of engines. Thus, the present invention can enable the effect on engine performance of changes to the engine to be determined rapidly. This has an advantage that engine design changes can be assessed quickly thereby facilitating engine design. Engines can be designed in which the concentration limit is reduced, for example to less than 7% by weight or to less than 5% by weight.

Monitoring the performance of the engine according to the present invention can be used to calibrate the engine for example, to determine suitable algorithms for crankcase lube drain intervals and/or particulate filter regeneration intervals (when such filters are used) and/or algorithms for safe and/or optimum operating conditions for the engine. Such algorithms may relate parameters such as accelerator pedal displacement and/or gear position with engine parameters such as fuel injection, torque control and power control. Monitoring the performance of the engine according to the present invention can be used to develop rapidly, fuel injector tuning strategies (for example including timing, pulse number and fuel volume).

The invention will now be described by way of example only and with reference to the following drawings in which FIG. 1 represents a graph of infra red adsorbance plotted against concentration of rapeseed oil methyl ester in unused crankcase lubricant, FIG. 2 represents a graph of estimated rapeseed oil methyl ester in used crankcase lubricant as determined according to the method of the present invention compared to actual concentration and FIG. 3 represents a graph of rapeseed oil methyl ester concentration in crankcase lubricant for an engine operated with fuel comprising 10% by weight rapeseed oil methyl ester.

Referring to the drawings, FIG. 1 represents a graph of rapeseed methyl ester (RME) concentration (weight %) in unused engine crankcase lubricant oil (Ford Reference Oil 913-B, a European automotive engine oil ACEA A1/B1, 5W-30) and infra red peak intensity at 1746 $cm^{-1}$ as determined by Infrared spectroscopy. The mixtures were prepared by weighing the RME (product code S04/70) into the oil to give concentrations shown in Table 1 below.

TABLE 1

| Concentration of RME in Reference Oil (wt %) |
|---|
| 0.11 |
| 0.267 |

TABLE 1-continued

Concentration of RME in Reference Oil (wt %)

0.397
0.54
0.805
1.073

The spectrometer was a FTIR spectrometer using single reflection attenuated total reflectance (ATR) operating in the mid-IR range. The cell was a single reflection zinc selenide ATR crystal. In the case of each analysis a background spectrum was measured, the spectrum of the oil used to make up the mixture was measured, and the spectrum of the RME/oil mixture was measured. Each spectrum required 16 scans at a resolution of 16 cm$^{-1}$. The spectrum of the oil was subtracted from that of the mixture. The absorbance peak intensity at 1746 cm$^{-1}$ was measured by using a baseline from 1700-1800 cm$^{-1}$.

The graph of FIG. 1 shows a clear correlation between RME concentration in the crankcase lubricant and the spectroscopic analysis.

Referring to FIG. 2, this represents a graph of rapeseed methyl ester (RME) concentration (weight %) in crankcase oil as measured by infra red spectroscopy and the actual concentration (weight %).

RME product code S04/070 was weighed into each used lube oil (from Ford cars), to make the following test mixtures, in amounts shown in Table 2.

TABLE 2

| Sample No. | Vehicle ID | Km | Actual RME added (wt %) | RME estimated by FTIR (wt %) |
|---|---|---|---|---|
| 1 | AP4A3387 | 15406 | 0.127 | 0.06 |
| 2 | AP4B3929 | 21694 | 0 | −0.02 |
| 3 | AP4B3929 | 18981 | 0.766 | 0.7 |
| 4 | AP3S3123 | 27314 | 1.23 | 1.26 |
| 5 | AP4A3387 | 62239 | 0.27 | 0.19 |
| 6 | AP4A3363 | 21244 | 0.579 | 0.52 |
| 7 | AP3S3123 | 43066 | 0.131 | 0.11 |
| 8 | AP4A3387 | 5063 | 0.439 | 0.39 |
| 9 | AP3S3123 | 7517 | 0.26 | 0.16 |
| 10 | AP3S3123 | 25002 | 0 | 0.07 |
| 11 | AP4A3387 | 35240 | 0.053 | 0.07 |
| 12 | AP4A3387 | 32697 | 0 | 0.05 |
| 13 | AP4A3362 | 41655 | 0.887 | 0.94 |

The spectrometer was a FTIR spectrometer using single reflection attenuated total reflectance (ATR) operating in the mid-IR range. The cell was a single reflection zinc selenide ATR crystal. In the case of each analysis a background was taken, the spectrum of the crankcase oil (Ford Reference Oil 913-B) was measured, and the spectrum of the used oil (containing added RME) was measured. Each spectrum required 16 scans at a resolution of 16 cm$^{-1}$. The spectrum of the crankcase oil (913-B) was subtracted from that of the used oil. The intensity of the peak at 1746 cm$^{-1}$ was measured by using a baseline from 1700-1800 cm$^{-1}$. The concentration of RME in each used oil was not known by the operator of the FTIR, but was estimated using the previous calibration (FIG. 1).

The graph in FIG. 2 shows a clear correlation between RME concentration in the crankcase lubricant and the spectroscopic analysis.

FIG. 3 represents a graph of rapeseed oil methyl ester concentration (weight %) in crankcase lubricant for an engine operated with fuel comprising 10% by weight rapeseed oil methyl ester (RME). Samples of used oil were received from the Ford test engine and also measured by the IR operating procedure as for the results used in FIG. 2. From the calibration graph (in FIG. 1), the absorbance measured in the test engine used oils, was converted to weight % of RME.

The graph shows ingress of RME from the fuel into the crankcase lubricant.

By draining the engine, filling with fresh oil and repeating the monitoring procedure, the performance of the engine may be determined at different operating conditions.

Having determined the performance of the engine, this can be used in the design of engines as herein described. Thus, the present invention can enable the effect on engine performance of changes to the engine to be determined rapidly. This has an advantage that engine design changes can be assessed quickly thereby facilitating engine design.

Having determined the performance of the engine, this can be used to calibrate the engine to determine suitable algorithms for crankcase lube drain intervals and/or particulate filter regeneration intervals (when such filters are used) and/or algorithms for safe and/or optimum operating conditions for the engine. Such algorithms can relate parameters such as accelerator pedal displacement and/or gear position with engine parameters such as fuel injection, torque control and power control.

Having monitored the performance of the engine, this can be used to develop fuel injector timing strategies (for example including timing, pulse number and fuel volume).

The invention claimed is:

1. A method for monitoring the performance of a compression-ignition, internal combustion engine which method comprises:
    lubricating the engine with a crankcase lubricant, and introducing a fuel to the engine to operate the engine, characterised in that
    the fuel comprises greater than 50% by weight of petroleum-based, middle distillate fuel oil and/or Fischer Tropsch derived, middle distillate fuel oil and 2.5% to 25% by weight of at least one lower alkyl ester of a fatty acid,
    and the performance of the engine is monitored by measuring the rate of ingress of lower alkyl ester of a fatty acid from the fuel into the crankcase lubricant by infra red spectroscopic analysis of the crankcase lubricant.

2. A method as claimed in claim 1 in which the fuel comprises greater than 50% by weight of petroleum-based, middle distillate fuel oil.

3. A method as claimed in claim 1 in which the fuel comprises 5 to 15% by weight of at least one lower alkyl ester of a fatty acid.

4. A method as claimed in claim 1 in which the lower alkyl ester of a fatty acid is a methyl, ethyl, propyl and/or butyl ester.

5. A method as claimed in claim 4 in which the lower alkyl ester of a fatty acid is an ester of a fatty acid in which the fatty acid has 10 to 25 carbon atoms, preferably 12 to 22 carbon atoms.

6. A method as claimed in claim 5 in which the fatty acid is selected from the group consisting of lauric acid, myristic acid, palmitic acid, palmitoleic acid, stearic acid, oleic acid, elaidic acid, petroselic acid, ricinoleic acid, elaestearic acid, linoleic acid, linolenic acid, eicosanoic acid, gadoleic acid, docosanoic acid, erucic acid and mixtures thereof.

7. A method as claimed in claim 1 in which the lower alkyl ester of a fatty acid is an ester of a fatty acid in which the fatty acid has 10 to 25 carbon atoms, preferably 12 to 22 carbon atoms.

8. A method as claimed in claim 7 in which the fatty acid is selected from the group consisting of lauric acid, myristic acid, palmitic acid, palmitoleic acid, stearic acid, oleic acid, elaidic acid, petroselic acid, ricinoleic acid, elaestearic acid, linoleic acid, linolenic acid, eicosanoic acid, gadoleic acid, docosanoic acid, erucic acid and mixtures thereof.

9. A method as claimed in claim 1 in which the lower alkyl ester of a fatty acid is rapeseed oil methyl ester.

10. A method as claimed in claim 1 in which the compression-ignition, internal combustion engine operates with a fuel which comprises at least 75% by weight of petroleum-based, middle distillate fuel oil.

11. A method as claimed in claim 1 in which the compression-ignition, internal combustion engine operates with a fuel which comprises at least 75% by weight of petroleum-based, middle distillate fuel oil and/or Fischer Tropsch derived middle distillate fuel oil.

12. A method as claimed in claim 1 in which the engine has a diesel particulate filter on its exhaust.

13. A method as claimed in claim 12 in which the engine is a direct injection, turbo diesel engine having a common rail injection system and at least one diesel particulate filter on its exhaust.

14. A method as claimed in claim 1 in which monitoring the performance of the engine is used in the design of engines.

15. A method as claimed in claim 1 in which monitoring the performance of the engine is used to calibrate the engine to determine suitable algorithms for crankcase lube drain intervals and/or particulate filter regeneration intervals, when such filters are used, and/or algorithms for safe and/or optimum operating conditions for the engine.

16. A method as claimed in claim 1 in which monitoring the performance of the engine is used to develop fuel injector timing strategies.

* * * * *